(12) United States Patent
Schwalm et al.

(10) Patent No.: US 7,169,841 B2
(45) Date of Patent: Jan. 30, 2007

(54) CURABLE AQUEOUS POLYURETHANE DISPERSIONS

(75) Inventors: Reinhold Schwalm, Wachenheim (DE); Bernd Bruchmann, Freinsheim (DE); Frank Voellinger, Edenkoben (DE); Erich Beck, Ladenburg (DE); Wolfgang Schrof, Neuleiningen (DE); Uwe Meisenburg, Duisburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 494 days.

(21) Appl. No.: 10/311,307

(22) PCT Filed: Jun. 26, 2001

(86) PCT No.: PCT/EP01/07245

§ 371 (c)(1),
(2), (4) Date: Dec. 27, 2002

(87) PCT Pub. No.: WO02/00754

PCT Pub. Date: Jan. 3, 2002

(65) Prior Publication Data

US 2003/0153673 A1    Aug. 14, 2003

(30) Foreign Application Priority Data

Jun. 27, 2000    (DE) .................................. 100 31 258

(51) Int. Cl.
  *C08J 3/00* (2006.01)
  *C08K 3/20* (2006.01)
  *C08L 75/00* (2006.01)
  *C08F 8/30* (2006.01)
  *C08F 283/04* (2006.01)

(52) U.S. Cl. ................ 524/507; 427/372.2; 427/385.5; 428/423.1; 524/589; 524/590; 524/591; 524/839; 524/840; 525/123; 525/131; 525/455

(58) Field of Classification Search ................ 524/507, 524/589, 590, 591, 839, 840; 525/455, 123, 525/131; 427/372.2, 385.5; 428/423.1
See application file for complete search history.

(56) References Cited

U.S. PATENT DOCUMENTS

| 5,296,529 A | 3/1994 | Yukawa et al. |
| 5,596,065 A | 1/1997 | Gerlitz et al. |
| 5,767,220 A | 6/1998 | Mason et al. |
| 5,859,135 A | 1/1999 | Doomen et al. |
| 6,747,088 B1 | 6/2004 | Schwalm et al. |

FOREIGN PATENT DOCUMENTS

| CA | 2 159 265 | 3/1996 |
| DE | 19860041 | 6/2000 |
| DE | 199 47 054 | 4/2001 |
| DE | 199 47 054 A1 | 4/2001 |
| DE | 100 33 697 A1 | 1/2002 |

OTHER PUBLICATIONS esp@cenet—English Abstract of DE 199 47 054 A1.
esp@cenet—English Abstract of DE 100 33 697 A1.

*Primary Examiner*—Patrick D. Niland
(74) *Attorney, Agent, or Firm*—Oblon, Spivak, McClelland, Maier & Neustadt, P.C.

(57) ABSTRACT

A curable aqueous polyurethane dispersion substantially comprises
a) at least one compound having two free isocyanate groups, at least one allophanate group and at least one C=C double bond capable of free radical polymerization, a carbonyl group or an oxygen atom in the form of an ether function being bonded directly to the double bond,
b) at least one compound having at least one group reactive toward isocyanate groups and having a C=C double bond capable of free-radical polymerization,
c) if required, at least one compound having at least two groups reactive towards isocyanate groups and selected from hydroxyl, mercapto, primary and/or secondary amino groups,
d) at least one compound having at least one group reactive towards isocyanate groups and having at least one acid group,
e) at least one basic compound for neutralizing or partially neutralizing the acid groups of the compounds d),
and a thermal initiator and is used for coating substrates.

18 Claims, No Drawings

CURABLE AQUEOUS POLYURETHANE DISPERSIONS

The present invention relates to UV-curable and heat-curable polyurethane dispersions, a process for their preparation and their use.

Radiation-curable polyurethane dispersions are disclosed, for example, in DE-A-44 34 554 and are prepared from polyisocyanates, hydroxyl-containing polyesters, compounds having a group reactive toward isocyanates and having an acid group and compounds having a group reactive toward isocyanates and having C=C double bonds. However, the products are unsatisfactory with regard to their processability.

U.S. Pat. No. 5,859,135 describes aqueous coating mixtures comprising a lipophilic polymer having at least one hydroxyl group and a molecular weight of up to 100 000, which is bonded on the one hand to a crosslinkable functional group and on the other hand, via a polyisocyanate, to a group having carboxyl groups and to a hydrophilic polyalkylene oxide monoether radical. The disadvantage is that coatings produced therewith have relatively pronounced intrinsic hydrophilic properties even after processing.

U.S. Pat. No. 5,296,529 describes a self-crosslinking resin having carboxyl groups, hydroxyl groups and blocked isocyanate groups, which is prepared from a) a copolymer of a vinyl monomer having free and blocked isocyanate groups with a styrene and/or (meth)acrylate comonomer and b) a hydroxyl- and carboxyl-containing polyester resin, some hydroxyl groups of the polyester resin being reacted with some free isocyanate groups of the vinyl copolymer and the remaining isocyanate groups then being blocked. It is clear that the risk of premature undesired crosslinking of the two polymers may prevent readily reproducible production of the system. Furthermore, the system described contains no UV-curable double bonds, and no radiation curing thereof is described.

German patent application P 199 47 054.5 describes UV-curable and heat-curable polyurethane dispersions based on aliphatic polyisocyanates, it also being possible for said polyisocyanates to be polyisocyanates containing allophanate groups. These dispersions inevitably contain isocyanate groups blocked with an isocyanate blocking agent.

DE-A-198 60 041 describes reaction products of a) polyisocyanates and b) low molecular weight hydroxyl compounds having C=C double bonds, such as hydroxyalkyl (meth)acrylates or hydroxyalkyl vinyl ethers, which for the most part are allophanates of the polyisocyanates with the unsaturated alcohols. The low molecular weight and low-viscosity reaction products have a high content of C=C double bonds in the molecule and can be cured both with UV radiation and with participation of the isocyanate groups, for example by the action of steam, ammonia or amines. A use in the form of aqueous dispersions is not described.

It is an object of the present invention to provide heat-curable and also UV-curable aqueous polyurethane dispersions. These should give coatings having good performance characteristics, such as good resistance to chemicals and good mechanical properties, in particular they should have high scratch resistance and, after treatment, should dry physically also in unexposed parts and should be suitable for exterior applications, such as automotive coatings.

We have found, surprisingly, that this object is achieved by curable aqueous polyurethane dispersions comprising
a) at least one compound having at least two free isocyanate groups, at least one allophanate group and at least one C=C double bond capable of free radical polymerization, a carbonyl group or an oxygen atom in the form of an ether function being bonded directly to the double bond,
b) at least one compound having at least one group reactive toward isocyanate groups and having a C=C double bond capable of free-radical polymerization,
c) if required, at least one compound having at least two groups reactive toward isocyanate groups and selected from hydroxyl, mercapto, primary and/or secondary amino groups,
d) at least one compound having at least one group reactive toward isocyanate groups and having at least one acid group,
e) at least one basic compound for neutralizing or partially neutralizing the acid groups of the compounds d),
f) if required, at least one compound differing from b), d) and e) and having only one group reactive toward isocyanate groups,
g) if required, at least one polyisocyanate differing from a),
h) at least one thermal initiator,
i) if required, further additives which are selected from reactive diluents, photoinitiators and conventional coating additives, and
k) water.

No compounds which contain isocyanate groups and in which some or all of the isocyanate groups have been reacted with blocking agents are used in the novel dispersions. Blocking agents are understood as meaning compounds which convert the isocyanate groups into blocked (capped or protected) isocyanate groups which then do not exhibit the usual reactions of a free isocyanate group below the deblocking temperature. Such compounds not used according to the invention and having blocked isocyanate groups are usually used in dual-cure coating materials which are subjected to final curing by curing involving the isocyanate groups.

After their preparation, the novel polyurethane dispersions preferably have substantially no free isocyanate groups.

Component a)

The novel compounds of component a) are preferably substantially free of uretdione, biuret or isocyanurate groups.

The component a) is preferably selected from compounds of the formula I

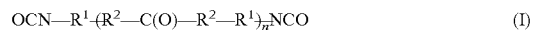

where
n is an integer from 1 to 10,
$R^1$ is a divalent aliphatic or alicyclic $C_2$- to $C_{20}$-hydrocarbon unit or an aromatic $C_6$- to $C_{20}$-hydrocarbon unit,
$R^2$ in each repeating unit is —NH— on the one hand and, on the other hand,

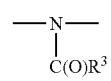

$R^3$ being a radical derived from an alcohol A by abstraction of the H atom from the alcoholic hydroxyl group, the alcohol A additionally having at least one C=C double bond capable of free radical polymerization, and a carbonyl group or an oxygen atom being bonded by an ether bond directly to the double bond.

The radicals $R^1$ are preferably those which are derived by abstraction of the isocyanate group from conventional aliphatic or aromatic polyisocyanates. The diisocyanates are preferably aliphatic isocyanates of 4 to 20 carbon atoms. Examples of these conventional diisocyanates are aliphatic diisocyanates, such as tetramethylene diisocyanate, hexylmethylene diisocyanate, octamethylene diisocyanate, decamethylene diisocyanate, dodecamethylene diisocyanate, tetradecamethylene diisocyanate, derivatives of lysine diisocyanate, tetramethylxylylene diisocyanate, cycloaliphatic diisocyanates, such as 1,4-, 1,3- or 1,2-diisocyanatocyclohexane, 4,41- or 2,4'-di(isocyanatocyclohexyl) methane, isophorone diisocyanate, 1,3- or 1,4-bis(isocyanatomethyl)cyclohexane, 2,4- and 2,6-diisocyanato-1-methylcyclohexane, and aromatic diisocyanates, such as tolylene 2,4- or 2,6-diisocyanate, m- or p-xylylene diisocyanate, 2,4'- or 4,4'-diisocyanatodiphenylmethane, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethyldiphenyl diisocyanate, 3-methyldiphenylmethane 4,4'-diisocyanate and diphenylether 4,4'-diisocyanate. Mixtures of said diisocyanates may be present. Hexamethylene diisocyanate, 1,3-bis(isocyanatomethyl)cyclohexane, isophorone diisocyanate, tetramethylxylylene diisocyanate and di(isocyanatocyclohexyl)methane are preferred.

The alcohols A from which $R^3$ is derived are, for example, esters of α,β-unsaturated carboxylic acids, such as acrylic acid, methacrylic acid (abbreviated to (meth)acrylic acid below), crotonic acid, acrylamidoglycolic acid, methacrylamido glycolic acid or vinyl acetic acid, and polyols having preferably 2 to 20 carbon atoms and at least 2 hydroxyl groups, such as ethylene glycol diethylene glycol, triethylene glycol, 1,2-propylene glycol, 1,3-propylene glycol, dipropylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, glycerol, trimethylolethane, trimethylolpropane, trimethylolbutane, pentaerythritol, ditrimethylolpropane, erythritol and sorbitol, provided that the ester has at least one OH group reactive toward isocyanate. Furthermore, the radicals $R^3$ may also be derived from the amides of (meth) acrylic acid with amino alcohols, e.g. 2-aminoethanol, 3-amino-1-propanol, 1-amino-2-propanol or 2-(2-aminoethoxy)ethanol, and the vinyl ethers of the abovementioned polyols, provided that they still have a free OH group.

Furthermore, unsaturated polyetherols or polyesterols or polyacrylate polyols having a mean OH functionality of from 2 to 10 are also suitable as reactive components.

Preferably, the radicals $R^3$ are derived from alcohols, such as 2-hydroxyethyl (meth)acrylate, hydroxypropyl (meth)acrylate, 1,4-butanediol mono(meth)acrylate, neopentylglycol mono(meth)acrylate, glyceryl mono- and di(meth)acrylate, trimethylolpropane mono- and di(meth)acrylate, pentaerythrityl di- and tri(meth)acrylate. The alcohol A is particularly preferably selected from 2-hydroxyethyl acrylate, 2-hydroxyethyl methacrylate, and hydroxypropyl (meth)acrylate. Examples of amides of ethylenically unsaturated carboxylic acids with amino alcohols are hydroxyalkyl (meth)acrylamides, such as N-hydroxymethyl(meth)acrylamide, N-hydroxyethyl(meth)acrylamide or 5-hydroxy-3-oxopentyl(meth)acrylamide, N-hydroxyalkylcrotonamides such as N-hydroxymethylcrotonamide, or N-hydroxyalkylmaleimides such as N-hydroxyethylmaleimide.

Component b)

The compounds of component b) have a C=C double bond capable of free radical polymerization and at least one further group reactive toward isocyanate groups. Preferred compounds of component b) are, for example, the monoesters of dihydric or polyhydric alcohols with α,β-ethylenically unsaturated mono- and/or dicarboxylic acids and their anhydrides. For example, acrylic acid, methacrylic acid, fumaric acid, maleic acid, maleic anhydride, crotonic acid, itaconic acid, etc. may be used as α,β-ethylenically unsaturated mono- and/or dicarboxylic acids and their anhydrides. Acrylic acid and methacrylic acid are preferably used. Suitable alcohols are, for example, diols, such as glycols, preferably glycols of 2 to 25 carbon atoms, e.g. 1,2-ethanediol, 1,3-propanediol, 1,4-butanediol, 1,3-butanediol, 1,5-pentanediol, 1,4-pentanediol, 1,6-hexanediol, 1,10-decanediol, diethylene glycol etc. Suitable triols and polyols have, for example 3 to 25, preferably 3 to 18, carbon atoms. These include, for example, glycerol, trimethylolpropane, erythritol, pentaerythritol, sorbitol, etc. The compounds of component b) are preferably selected from 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, trimethylolpropane monoacrylate and mixtures thereof. If desired, these compounds can also be subjected to chain extension by reaction with a suitable chain extender, for example a polyfunctional isocyanate or a polyfunctional carboxylic acid.

Suitable compounds b) are furthermore the esters and amides of amino alcohols with the abovementioned α,β-ethylenically unsaturated mono- and/or dicarboxylic acids, hydroxyalkyl vinyl ethers, such as hydroxybutyl vinyl ethers, etc.

Component c)

Suitable compounds c) are both low molecular weight alcohols and polymeric polyols. Low molecular weight alcohols having a molecular weight of not more than 500 g/mol are preferred. Alcohols having from 2 to 20 carbon atoms and 2 to 6 hydroxyl groups, for example the abovementioned glycols, are particularly preferred. Hydrolysisstable short-chain diols of 4 to 20, preferably 6 to 12, carbon atoms, are particularly preferred. These preferably include dihydroxymethylcyclohexane, bis(hydroxycyclohexyl)propane, tetramethylcyclobutanediol, cyclooctanediol or norbornanediol. Aliphatic hydrocarbon-diols such as the isomeric butanediols, pentanediols, hexanediols, heptanediols, octanediols, nonanediols, decanediols, undecanediols, and dodecanediols, are particularly preferred. 1,4-butanediol, 1,4-pentanediol, 1,5-pentanediol, 1,6-hexanediol, 2,5-hexanediol, dihydroxymethylcyclohexane, bis-hydroxycyclohexylpropane, etc. are particularly preferred.

Suitable compounds c) are furthermore polymeric polyols. The number average molecular weight Mn of these polymers is preferably from about 1000 to 100 000, particularly preferably from 2000 to 10 000. The OH numbers are preferably from about 40 to 200 mg of KOH/g of polymer. Preferred polymers c) are, for example, copolymers which contain at least one of the abovementioned monoesters of dihydric or polyhydric alcohols with at least one α,β-ethylenically unsaturated mono- and/or dicarboxylic acid and at least one further comonomer, preferably selected from vinyl aromatics, e.g. styrene, esters of the abovementioned α,β-unsaturated mono- and/or dicarboxylic acids with monoalcohols, vinyl esters of carboxylic acids of up to 20 carbon atoms, vinyl halides, nonaromatic hydrocarbons having 4 to 8 carbon atoms and 1 or 2 double bonds, unsaturated nitriles, etc. and mixtures thereof as polymerized units. These furthermore include (partially) hydrolyzed vinyl ester polymers, preferably polyvinyl acetates. These furthermore include polyesterols based on aliphatic, cycloaliphatic and/or aromatic di-, tri- and/or polycarboxylic acids with di-, tri- and/or polyols and lactone-based polyesterols. These furthermore include polyetherols, which are obtainable by polymerization of cyclic ethers or by reaction of alkylene oxides with an initiator molecule, and $\alpha,\omega$-diaminopolyethers obtainable by reaction of polyetherols with ammonia. These furthermore include conventional polycarbonates known to a person skilled in the art and having terminal hydroxyl groups, which are obtainable, for example, by reaction of the abovementioned diols with phosgene or diesters of carboxylic acids.

The abovementioned components c) may be used individually or as mixtures.

Component d)

Preferably, the acid groups of the compounds of component d) are selected from carboxyl groups, sulfone groups, phosphonic acid groups, and phosphoric acid groups. Carboxyl and sulfo groups are preferred.

Particularly suitable compounds d) having at least one group reactive toward isocyanates and having at least one carboxyl or sulfo group are aliphatic monomercapto-, monohydroxy- and monoamino- and iminocarboxylic acids and corresponding sulfonic acids, such as mercapto acetic acid (thioglycolic acid), mercaptopropionic acid, mercaptosuccinic acid, hydroxyacetic acid, hydroxypropionic acid (lactic acid), hydroxysuccinic acid, hydroxypivalic acid, dimethylolpropionic acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminopropanesulfonic acid, glycine (aminoacetic acid) or iminodiacetic acids.

Component e)

Suitable basic compounds e) for neutralizing or partially neutralizing the acid groups of the compounds d) are inorganic and organic bases, such as alkali metal and alkaline earth metal hydroxides, oxides, carbonates, and bicarbonates and ammonia or primary, secondary or tertiary amines. Neutralization or partial neutralization with amines, such as ethanolamine or diethanolamine, and particularly with tertiary amines, such as triethylamine, triethanolamine, dimethylethanolamine or diethylethanolamine, is preferred. The amounts of chemically bonded acid groups introduced and the degree of the neutralization of the acid groups (which is generally from 40 to 100%, based on equivalents) should preferably be sufficient to ensure dispersing of the polyurethanes in an aqueous medium, which is familiar to a person skilled in the art.

Component f)

In the novel dispersions, at least one further compound having a group reactive toward isocyanate groups can be used as component f). This group may be a hydroxyl, mercapto or primary or secondary amino group. Suitable compounds f) are the conventional compounds which are known to a person skilled in the art and are usually used in the polyurethane preparation as stoppers for reducing the number of reactive free isocyanate groups or for modifying the polyurethane properties. They include, for example, monofunctional alcohols, such as methanol, ethanol, n-propanol, isopropanol, etc. Suitable components f) are also amines having a primary or secondary amino group, e.g. methylamine, ethylamine, n-propylamine, diisopropylamine, dimethylamine, diethylamine, di-n-propylamine, diisopropylamine, etc.

Component g)

In the novel dispersions at least one polyisocyanate differing from the compounds of component a) may be used as components g). According to the invention, no polyisocyanates in which the isocyanate groups have been reacted with a blocking agent are used as component g).

Preferred compounds g) are polyisocyanates having an NCO functionality from 2 to 4.5, particularly preferably from 2 to 3.5. Aliphatic, cycloaliphatic and araliphatic diisocyanates are preferably used as component g). These include, for example, tetramethylene diisocyanate, hexamethylene diisocyanate, 2,3,3-trimethylhexamethylene diisocyanate, cyclohexylene 1,4-diisocyanate, isophorone diisocyanate, 1,3- and 1,4-bis(isocyanatomethyl)cyclohexane, di-(isocyanatocyclohexyl)methane, tetramethylxylylene diisocyanate and mixtures thereof. Compounds g) which also have a group selected from the group consisting of the urethane, urea, biuret, allophanate, carbodiimide, uretonimine, uretdione and isocyanurate groups in addition to 2 or more isocyanate groups, are preferred.

Isophorone diisocyanate, 1,3- and 1,4-bis(isocyanatomethyl) cyclohexane, their isocyanurates, biurets and allophanates and mixtures thereof are preferably used as component g).

If the novel dispersions also contain a component g) in addition to the component a) the amount of the compound of component g) is preferably from 0.1 to 90, particularly preferably from 1 to 50, in particular from 5 to 30, % by weight, based on the total amount of the compounds of components a) and g).

Component h)

Preferred thermal initiators h) are those which have a half-life at 60° C. of at least one hour, preferably at least 2 hours. The half-life of a thermal initiator is the time after which half the initial amount of the initiator has decomposed into free radicals. These initiators generally permit film formation on a substrate coated with a novel dispersion, by conventional methods, for example drying in the air with heating, substantially no thermal initiation and curing taking place as yet.

The component h) is preferably used in an amount of from 0.1 to 10, preferably from 0.5 to 5, % by weight, based on the total amount of the components a) to i).

Suitable compounds h) are in general all compounds which decompose into free radicals under the curing conditions, e.g. peroxides, hydroperoxides, hydrogen peroxide, persulfates, azo compounds, highly substituted, e.g. hexasubstituted, ethanes, amine-N-oxides, redox catalysts, etc. Water-soluble initiators are preferably used. Suitable thermal initiators are, for example, triphenylmethylazobenzene, benzoyl peroxide, di-tert-butyl peroxide, cumyl hydroperoxide, dicumyl peroxide, tert-butyl perbenzoate, 2,2,6,6-tetramethylpiperidin-1-oxyl, benzopinacol and derivatives thereof, as well as (arylsulfonyl)acetic acid alkyl ester, preferably (phenylsulfonyl)acetic acid methyl ester.

Furthermore, the component h) preferably comprises at least one thermal initiator having at least one group reactive toward isocyanate groups, the initiator, after reaction with a compound containing isocyanate groups, also being capable of liberating the radicals thermally. These include, for example, initiators which have at least one hydroxyl group, via which they can be incorporated into the polymer.

Hexasubstituted ethanes, in particular benzopinacol and the derivatives thereof, silylated pinacols, which are commercially available, for example, under the tradename ADDID 600 from Wacker, or hydroxyl-containing amine N-oxides, such as 4-hydroxy-2,2,6,6-tetramethylpiperidin-1-oxyl (TEMPOL), are preferred.

Component i)

The novel dispersion may contain at least one further compound as usually used as a reactive diluent. Such compounds include, for example, reactive diluents as described in P. K. T. Oldring (Editor), Chemistry & Technology of UV & EB Formulations for Coatings, Inks & Paints, Vol. II, Chapter III: Reactive diluents for UV & EB Curable Formulations, Wiley and SITA Technology, London 1997.

Preferred reactive diluents are compounds which differ from the component b) and have at least two functional groups which are selected from C=C double bonds capable of free radical polymerization and groups reactive toward isocyanate groups. These include, in particular, the diesters and polyesters of the abovementioned α,β-ethylenically unsaturated mono- and/or dicarboxylic acids with diols or polyols. Hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythrityl diacrylate, dipentaerythrityl tetraacrylate, dipentaerythrityl triacrylate, pentaerythrityl tetraacrylate, etc. are particularly preferred. The esters of alkoxylated polyols with α,β-ethylenically unsaturated mono- and/or dicarboxylic acids, for example the polyacrylates or polymethacrylates of alkoxylated trimethylolpropane, glycerol or pentaerythritol, are also preferred. The esters of alicyclic diols, such as cyclohexanediol di(meth)acrylate and bis(hydroxymethylethyl)cyclohexane di(meth)acrylate, are furthermore suitable. Further suitable reactive diluents are trimethylolpropane monoformal acrylate, glyceryl formal acrylate, 4-tetrahydropyranyl acrylate, 2-tetrahydropyranyl methacrylate and tetrahydrofurfuryl acrylate.

If the curing of the novel dispersions is carried out not only thermally but also by means of UV radiation, the novel formulations preferably contain at least one photoinitiator which is capable of initiating the polymerization of ethylenically unsaturated double bonds. These include, for example benzophenone and benzophenone derivatives such as 4-phenylbenzophenone and 4-chlorobenzophenone, Michler's ketone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl, ethyl and butylbenzoin ethers, benzil ketals, such as benzyl dimethyl ketal, 2-methyl-1-[4-(methylthio)phenyl]-2-morpholinopropan-1-one, anthraquinone and its derivatives, such as methylanthraquinone and tert-butylanthraquinone and acylphophine oxides, such as 2,4,6-trimethylbenzoyldiphenylphosphine oxide, ethyl-2,4,6-trimethylbenzoylphenylphosphinate, ethyl-2,4,6-trimethylbenzoylphenylphosphinate and bisacylphosphine oxides.

The novel dispersions particularly preferably contain at least one photoinitiator which is selected from phenyl glyoxylic acid and the esters and salts thereof. Compounds of the formula I

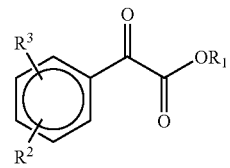

I where $R^1$ is hydrogen or $C_1$–$C_{18}$-alkyl, are particularly preferred. $R^1$ is preferably $C_1$–$C_8$ alkyl, in particular methyl, ethyl, propyl, butyl or hexyl.

$R^2$ and $R^3$, independently of one another, are each hydrogen, $C_1$–$C_{18}$-alkyl or $C_1$–$C_{18}$-alkoxy.

$R^2$ and $R^3$, independently of one another, are each hydrogen.

If at least one of the two radicals $R^2$ and $R^3$ is not hydrogen, the phenyl ring is preferably substituted in the paraposition (4-position) relative to the carbonyl group.

Phenylglyoxylic esters of the formula I

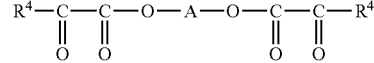

II where the radicals $R^4$, independently of one another, are each a radical of the formula

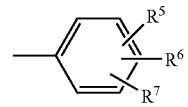

$R^5$, $R^6$ and $R^7$, independently of one another, are each H, $C_1$–$C_6$-alkyl, which is unsubstituted or substituted by OH, $OC_1$–$C_6$-alkyl or $OCOC_1$–$C_6$-alkyl, or OH or $OC_1$–$C_6$-alkyl, A is $C_2$–$C_6$-alkylene or a radical of the formulae

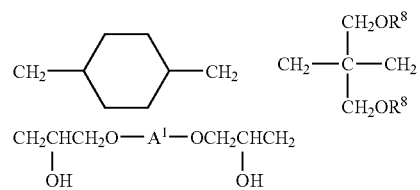

the radicals $R^8$, independently of one another, are each H or $COCOR^4$ and $A^1$ is $C_2$-$C_6$-alkylene or

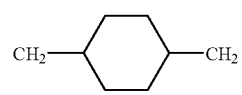

are furthermore particularly preferred.

Such compounds are described in DE-A-198 26 712 and German patent application P-199 13 353.0, which are hereby fully incorporated by reference. Preferably, the photoinitiators described above and based on phenylglyoxylic acid derivatives are suitable for exterior applications since they undergo little or no yellowing.

The novel dispersions contain the photoinitiators preferably in an amount of from 0.05 to 10, particularly preferably from 0.1 to 8, in particular from 0.2 to 5, % by weight, based on the total amount of the components a) to i).

The novel dispersions may contain further additives, customary for coating, such as a leveling agents, antifoams, UV absorbers, dyes, pigments and/or fillers.

Suitable fillers include silicates, for example silicates obtainable by hydrolysis of silicon tetrachloride, such as Aerosil R from Degussa, silica, talc, aluminum silicates, magnesium silicates, calcium carbonates, etc. Suitable stabilizers include typical UV absorbers, such as oxanilides, triazines and benzotriazole (the latter is available as Tinuvin R grades from Ciba-Spezialitätenchemie) and benzophenones. These may be used alone or together with suitable free radical acceptors, for example stearically hindered amines, such as 2,2,6,6-tetramethylpiperidine, 2,6-di-tert-butylpiperidine or derivatives thereof, e.g. bis(2,2,6,6-tetramethyl-4-piperidyl) sebacate. Stabilizers are usually used in amounts of from 0.1 to 5.0% by weight, based on the solid components contained in the formulation.

The solids content of the novel aqueous dispersions is preferably from about 5 to 70, in particular from 20 to 50, % by weight. Preferred dispersions are those in which isocyanate groups of the compounds of component a) and, if present, g) have been reacted to an extent of from 5 to 98, preferably from 10 to 80, mol % with groups of at least one compound of component b) which are reactive toward isocyanate groups, from 0 to 70, preferably from 20 to 60, mol % with groups of at least one compound of component c) which are reactive toward isocyanate groups, from 2 to 10, preferably from 4 to 8, mol % with groups of at least one compound of component d) which are reactive toward isocyanate groups.

The novel dispersions are particularly suitable for coating substrates, such as wood, paper, textiles, leather, nonwovens, plastic surfaces, glass, ceramic, mineral building materials, such as cement bricks and fiber cement boards, and in particular metals or coated metals.

After exclusively thermal curing, the novel dispersions advantageously form films having good performance characteristics, such as good scratch resistance, good resistance to chemicals, good weathering stability and/or good mechanical properties. However, they are particularly preferably suitable for dual-cure applications in which an article coated with at least one novel dispersion is subjected to at least one curing step using high-energy radiation and at least one thermal curing step.

The present invention furthermore relates to a process for coating articles, wherein i) an article is coated with a dispersion as described above ii) volatile components of the dispersion are removed for film formation under conditions under which the thermal initiator h) substantially still forms no free radicals, iii) if required, the film formed in step ii) is exposed to high-energy radiation, the film being precured, and then, if required, the article coated with the precured film being mechanically processed or the surface of the precured film being brought into contact with another article, and iv) the film is subjected to thermal final curing.

Steps iv) and iii) can also be carried out in the reverse sequence, i.e. the film can be first thermally cured and then cured using high-energy radiation.

The present invention furthermore relates to coated articles which are obtainable by this process.

The coating of the substrates is effected by conventional processes known to a person skilled in the art, at least one novel dispersion being applied in the desired thickness to the substrate to be coated and the volatile components of the dispersions being removed. This procedure can, if desired, be repeated one or more times. The application to the substrate can be effected in a known manner, for example by spraying, applying with a trowel, knife coating, applying with a brush, roller coating or pouring. The thickness of the coating is as a rule from about 3 to 1000, preferably from 10 to 200, g/m$^2$.

The curing of the films formed on the substrate can, if desired, be effected exclusively thermally. In general, however, the coatings are cured both by exposure to high-energy radiation and thermally.

If a plurality of coats of the coating material are applied one on top of the other, radiation curing can if required be effected after each coating operation.

The radiation curing is effected by the action of high-energy radiation, i.e. UV radiation or daylight, preferably light having a wavelength of from 250 to 600 nm, or by exposure to high-energy electrons (electron beams; from 150 to 300 keV). The radiation sources used are, for example, high-pressure mercury vapor lamps, lasers, pulsed lamps (flash light), halogen lamps or excimer lamps. The radiation dose usually sufficient for crosslinking in the case of UV curing is from 80 to 3000 mJ/cm$^2$.

The exposure to radiation can, if required, also be carried out in the absence of oxygen, for example under an inert gas atmosphere. Suitable inert gases are preferably nitrogen, noble gases, carbon dioxide or combustion gases. Furthermore, the exposure to radiation can be effected by covering the coating material with transparent media. Transparent media are, for example, plastic films, glass or liquids, e.g. water.

In a preferred process, the curing is effected continuously by moving the substrate treated with the novel formulation past a radiation source at constant speed. For this purpose, it is necessary for the curing rate of the novel formulation to be sufficiently high.

It is possible to make use of this different time variation of the curing in particular when the coating of the article is also followed by another processing step in which the firm surface comes into direct contact with another article or is mechanically processed.

The advantage of the novel dispersions is that the coated article can be further processed immediately after the radiation curing since the surface is no longer tacky. On the other hand, the precured film is still so flexible and extensible that the article can still be deformed without the film flaking or tearing.

Even if no deformation of the article is intended, the dual-cure process may prove advantageous because the articles provided with precured film can be particularly easily transported and stored, for example in stacks. In addition, the dual-cure process has the advantage that the coating materials can be chemically postcured in dark parts (parts not accessible to the radiation) and hence adequate material properties can still be achieved independently of the exposure to radiation. Furthermore, spray mist deposits cure without tack and without omission.

The present invention furthermore relates to the use of a dispersion, as described above, for coating substrates of metal, wood, paper, ceramic, glass, plastics, textile, leather, nonwovens or mineral building materials.

The novel dispersions are particularly preferably suitable as or in exterior coatings, preferably of buildings or parts of buildings, road markings or coatings on vehicles and aircraft. In particular, the novel dispersions are used as or in automotive clear coat(s).

The nonrestricting examples which follow illustrate the invention.

EXAMPLES

Unless stated otherwise, parts and percentages are by weight.

The scratch resistance was assessed in an abrasion test in which 50 double strokes were performed with a Scotch-Brite fabric under a weight of 750 g. The degree of scratching was determined by determining the decrease in gloss.

Example 1

1a) Preparation of allophanate from hexamethylene diisocyanate and 2-hydroxyethylacrylate:

Hexamethylene diisocyanate was mixed with 40 mol % (based on the isocyanate) of 2-hydroxyethyl acrylate while blanketing with nitrogen and was heated to 80° C. After the addition of 200 ppm by weight (based on diisocyanate) of N,N,N-trimethyl-N-(2-hydroxypropyl)ammonium-2-ethyl-hexanoate, the temperature was slowly increased to 120° C. and this reaction temperature was maintained. When the mixture had an isocyanate content of 13.5% by weight, the reaction was stopped by adding 250 ppm by weight (based on diisocyanate) of di(2-ethylhexyl) phosphate. The reaction mixture was then freed from unconverted hexamethylene diisocyanate in a thin-film evaporator at 135° C. and 2.5 mbar. After the distillation, the product had an NCO content of 13.5% by weight and a viscosity of 810 mPas at 23° C.

1b) Preparation of the aqueous polyurethane dispersion:

100 parts of the allophanate from example 1a), 12.4 parts of decanediol, 0.13 part of 2,6-di-tert-butyl-p-cresol, 0.1 part of hydroquinone monomethyl ether and 0.03 part dibutyltin dilaurate were initially taken in a stirred kettle. 9.9 parts of hydroxyethyl acrylate were then added and the resulting mixture was stirred for 3 hours at 70° C. After the addition of 2 parts of thioglycolic acid and 1.1 parts of methanol, stirring was continued for a further 4 hours at 70° C. and the reaction batch was then cooled. After the addition of 2.3 parts of triethylamine, the resulting product was dispersed in water.

Example 2

Preparation of an aqueous polyurethane dispersion with incorporated thermal initiator:

The procedure was as in example 1, the amount of methanol being replaced by benzopinacol.

Production and Testing of Films:

The dispersions of examples 1 and 2 were applied to various substrates, without the addition of an initiator and after addition of a thermal initiator and, if required, of a photoinitiator, as stated in table 1, so that coating films having a thickness of about 40 mm resulted. The films were dried overnight in the air at room temperature and were then heated for 15 minutes at 60° C.

For assessing the purely thermal curing of the formulation to which a thermal initiator was added, the scratch resistance after curing for 30 minutes in a drying oven at 150° C. is shown in table 1. Furthermore, the films of the formulations to which a photoinitiator was additionally added, were subjected to radiation curing on a conveyor belt at a speed of 10 m/min using two UV lamps (80 W/cm) and subsequent thermal curing for 30 minutes in a drying oven at 150° C. The results of the scratch resistance test are likewise shown in table 1.

TABLE 1

| Dispersions from Example No. | Initiator | Scratch resistance (decrease in gloss/%) |
|---|---|---|
| 1 (Comparison) | None | 90 |
| 1 | 4% by weight of tert-butyl pivalate | 46 |
| 1 | 3% by weight of Irgacure ® I500[1]/5% by weight of benzopinacol (separate) | 24 |
| 2 | 0.8% by weight of benzo-pinacol (incorporated)[2] | 40 |
| 2 | 0.8% by weight of benzo-pinacol (incorporated) 3% by weight of Irgacure ® | 32 |
| 1 | 3% by weight of Irgacure ® I500/5% by weight of dibenzylperoxide | 32 |
| 1 | 3% by weight of Irgacure ® I500/5% by weight of tert-butyl perbenzoate | 43 |
| 1 | 3% by weight of Irgacure ® I500/5% by weight of (phenylsulfonyl) acetic acid methyl ester | 32 |

[1]Mixtures of 1-hydroxycyclohexyl phenyl ketone and benzophenone (from Ciba)
[2]1.1 parts by weight, based on components of the polymer

We claim:

1. A curable aqueous polyurethane dispersion, comprising:
   a) at least one compound having at least two free isocyanate groups, at least one allophanate group and at least one C=C double bond capable of free radical polymerization, wherein a carbonyl group or an oxygen atom in the form of an ether function is bonded directly to the double bond,
   b) at least one compound having at least one group reactive toward isocyanate groups and having a C=C double bond capable of free-radical polymerization,
   c) optionally at least one compound having at least two groups reactive toward isocyanate groups and selected from the group consisting of hydroxyl, mercapto, primary secondary amino groups, and combinations thereof,
   d) at least one compound having at least one group reactive toward isocyanate groups and having at least one acid group, e) at least one basic compound for neutralizing or partially neutralizing the acid groups of the compound d), f) optionally at least one compound different from b), d) and e) and having only one group reactive toward isocyanate groups, g) optionally at least one polyisocyanate different from a), h) at least one thermal initiator, i) optionally, one or more further additives selected from the group consisting of reactive diluents, photoinitiators and conventional coating additives, and k) water.

2. The dispersion as claimed in claim 1, wherein the component a) is of formula I

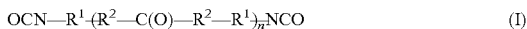

$$OCN-R^1-(R^2-C(O)-R^2-R^1)_n NCO \quad (I)$$

where n is an integer from 1 to 10, $R^1$ is a divalent aliphatic or alicyclic $C_2$- to $C_{20}$-hydrocarbon unit or an aromatic $C_6$- to $C_{20}$-hydrocarbon unit, $R^2$ in each repeating unit may be —NH— or

$$-\underset{\underset{C(O)R^3}{|}}{N}-$$

wherein $R^3$ is a radical derived from an alcohol A by abstraction of the H atom from the alcoholic hydroxyl group of the alcohol A, the alcohol A additionally having at least one C═C double bond capable of free-radical polymerization and a carbonyl group or an oxygen atom bonded by an ether bond directly to the double bond.

3. The dispersion as claimed in claim 1, wherein the thermal initiator h) has a half-life at 60° C. of at least one hour.

4. The dispersion as claimed in claim 1, wherein the component h) comprises at least one compound which has at least one group reactive toward isocyanate groups and is capable of liberating free radicals thermally even after reaction with a compound containing isocyanate groups.

5. The dispersion as claimed in claim 1, wherein the component h) comprises benzopinacol or a derivative thereof.

6. The dispersion as claimed in claim 1, wherein the component h) comprises an (arylsulfonyl) acetic acid alkyl ester.

7. The dispersion as claimed in claim 1, wherein the isocyanate groups of the compounds of component a) and, if present, g) are reacted to an extent of from 5 to 98 mol % with groups of at least one compound of component b) which are reactive toward isocyanate groups, from 0 to 70 mol % with groups of at least one compound of component c) which are reactive toward isocyanate groups, from 2 to 10, mol % with groups of at least one compound of component d) which are reactive toward isocyanate groups.

8. A process for coating an article, comprising i) coating an article with a dispersion as claimed in claim 1, ii) removing volatile components of the dispersion for film formation under conditions under which the thermal initiator h) substantially forms no free radicals, iii) optionally, exposing the film formed in step ii) to high-energy radiation to precure the film, and then, optionally, coating the article with the precured film, wherein the article coated with the precured film is mechanically processed or the surface of the precured film is brought into contact with another article, and iv) subjecting the film to thermal final curing.

9. A coated article obtained by the process as claimed in claim 8.

10. The dispersion as claimed in claim 7 wherein the isocyanate groups of the compounds of component a) and, if present, g) are reacted to an extent of from 10 to 80 mol % with groups of at least one compound of component b).

11. The dispersion as claimed in claim 7, wherein the isocyanate groups of the compounds of component a) and, if present, g), are reacted to an extent of from 20 to 60 mol % with groups of at least one compound of component c).

12. The dispersion as claimed in claim 7, wherein the isocyanate groups of the compounds of component a) and, if present, g) are reacted to an extent of from 4 to 8 mol % with groups of at least one compound of component d).

13. A method comprising:

coating a substrate with the dispersion as claimed in claim 1.

14. The method of claim 13, wherein the substrate comprises metal, wood, paper, ceramic, glass, plastic, textile, leather, nonwoven or a mineral building material.

15. A method comprising coating a surface with the dispersion as claimed in claim 1, wherein the surface is an exterior coating.

16. The method of claim 15 wherein the surface is a surface of a building, a portion of a building, a road marking, a coating on a vehicle or a coating on an aircraft.

17. An automotive clear coat comprising the dispersion as claimed in claim 1.

18. A curable aqueous polyurethane dispersion, comprising:

a) at least one compound having at least two free isocyanate groups, at least one allophanate group, and at least one C═C double bond capable of free radical polymerization, a carbonyl group or an oxygen atom in the form of an ether function directly bonded to the double bond, b) at least one compound having at least one group reactive toward isocyanate groups and having a C═C double bond capable of free-radical polymerization, c) optionally at least one compound having at least two groups reactive toward isocyanate groups and selected from the group consisting of hydroxyl, mercapto, primary secondary amino groups, and combinations thereof, d) at least one compound having at least one group reactive toward isocyanate groups and having at least one acid group, e) at least one basic compound for neutralizing or partially neutralizing the acid groups of the compound d), f) optionally at least one compound different from b), d) and e) and having only one group reactive toward isocyanate groups, g) optionally at least one polyisocyanate different from a), h) at least one thermal initiator, i) optionally, one or more further additives selected from the group consisting of reactive diluents, photoinitiators and conventional coating additives, and k) water.

* * * * *